United States Patent Office 2,776,122
Patented Jan. 1, 1957

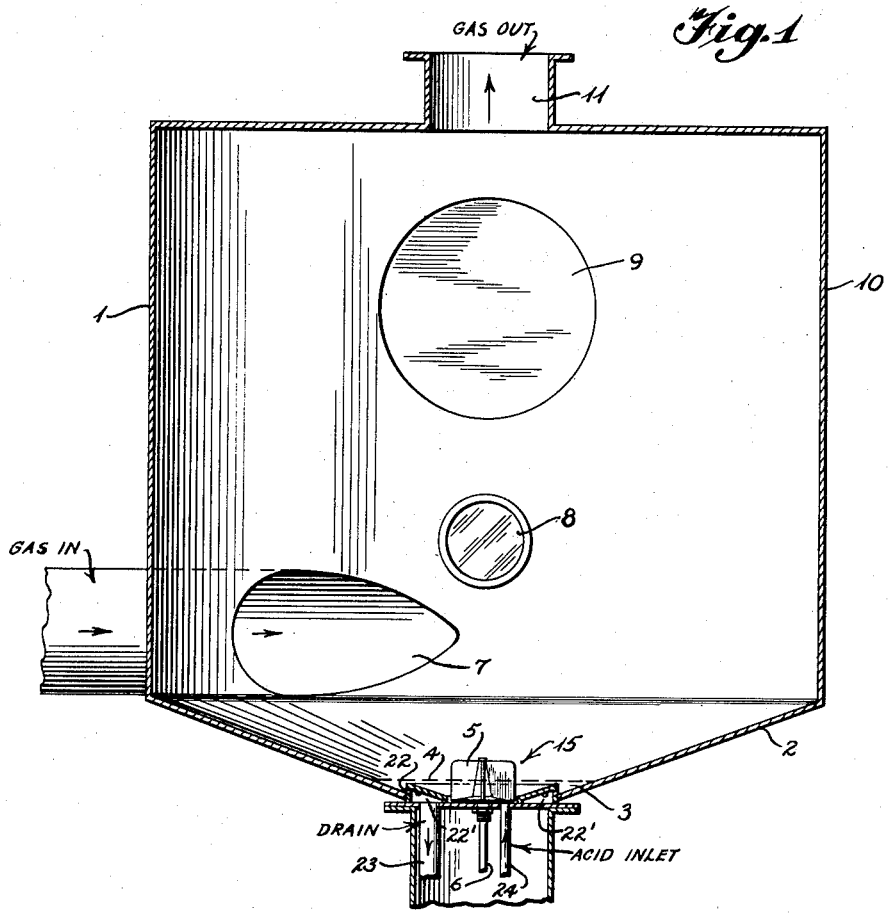
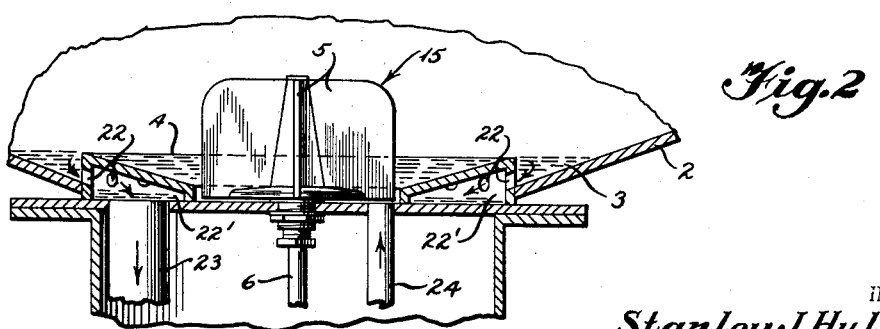

2,776,122

GAS AND LIQUID CONTACTING APPARATUS

Stanley J. Hultman, Corpus Christi, Tex., assignor to Columbia-Southern Chemical Corporation, Allegheny County, Pa., a corporation of Delaware Application February 4, 1953, Serial No. 335,010

4 Claims. (Cl. 261—79)

This invention relates to an improved apparatus for scrubbing gases, and, in particular, to an improved apparatus for drying wet chlorine gas.

Corrosive gases, and, in particular, chlorine, usually are produced in the gaseous form, either saturated with water vapor or at least partly so. This water must be eliminated to avoid corrosion during transportation and storage of the corrosive gas. In the case of chlorine, the standard electrolytic cell produces a gaseous chlorine mixture containing as much as 50% by weight of moisture. This moisture content is reduced by cooling the wet chlorine gas to about 50° F. Such cooling usually reduces the moisture content to approximately 0.3%. Even this relatively low moisture content is undesirable, since it is well known that wet chlorine is highly corrosive, whereas dry chlorine may be easily stored with relatively little trouble. For this reason, an essential feature in every chlorine plant has been the drier.

Driers have taken many forms in the several major chlorine producing installations throughout the world, but the most popular has been the countercurrent packed tower where the chlorine passes upward through a downward trickle of concentrated sulfuric acid. The acid dehydrates the chlorine very efficiently, but there are nevertheless several disadvantages to this type of apparatus. A principal disadvantage is that the chlorine contains many impurities which contaminate the acid with a taffy-like residue. This residue eventually blocks up the tower packing, and at all times presents the very serious operating hazard of handling under pressure concentrated sulfuric acid containing dissolved water, chlorine, and the taffy-like organic materials. In addition to the enhanced corrosion problem presented by the presence of water and chlorine, the taffy-like residues always present the danger of stopping up a pipe while the line is under pressure, with the possibility of an exceedingly dangerous spray should the line burst.

Another disadvantage of the tower type of equipment is the high initial cost of the equipment and necessary large amount of building space, as well as high maintenance and space or rental charges.

Richter's Patent No. 1,431,981 describes a process now little used, but is illustrative of the methods tried in the past to avoid the use of the sulfuric acid tower. Richter used a preliminary drying step with refrigerated calcium chloride brine replacing sulfuric acid in the countercurrent packed tower. After this preliminary step, conventional final drying with sulfuric acid followed. Obviously this two step, double apparatus process was more expensive than a single step acid drying, and it is little used today.

The object of this invention is to overcome these disadvantages of the prior art and to provide a drying apparatus for chlorine which will be simple and safe, inexpensive, yet efficient. Specifically, the object of this invention is to provide an apparatus for drying corrosive gases wherein it is not necessary to handle sulfuric acid under pressure, but at the same time to provide an apparatus which is an efficient drier and of low cost.

These and other objects of the invention are achieved by providing intimate contact between the sulfuric acid and corrosive gas in a single container in which there is a continual fine spray of sulfuric acid, which acid is continuously recycled within the same single container, for reuse.

The apparatus embodying the invention is not complex mechanically, and it may be understood easily by reference to the drawing.

Figure 1 shows a cross-sectional view of the tank and of the impeller. Figure 2 is an enlarged detail drawing of the impeller and tank bottom, showing particularly the acid inlet and outlet means.

In Figure 1, the gas drier is shown as consisting of a tank 1 with a conical bottom 2. A pool of sulfuric acid, 4, rests in the bottom of the tank, with the top level of the pool 4 of sulfuric acid just covering the bottom edge of the impeller. In practice, the bottom edge of the impeller is operated at a depth of perhaps ⅛ inch to ¼ inch below the top surface of the acid. This permits the impeller to pick up the acid and discharge it in the form of a spray. The impeller 15 is driven by a drive shaft 6, deriving its power from any conventional power source, not illustrated. The tank 1 is provided with a gas inlet 7, and a gas outlet at 11 at the top of the tank. Gases enter through an inlet 7 at the outer circumference of the tank, swirl around in the tank and are in intimate contact with the spray of acid thrown up by the impeller and the dried gases finally leave through the central opening 11 at the top of the tank. A sight glass 8 and a manhole 9 provide for ready control and inspection and for easy access to the tank.

The acid inlet and outlet scheme may be best understood by reference to Figure 2. Acid enters the tank in a continuous flow through line 24 and forms a pool 4. The impeller 15 rotates continuously in a single direction, and the acid is thrown from the pool 4 in a fine spray of small droplets throughout the tank by the impeller vanes 5. An intimate contact between the acid and the wet gas is thereby achieved, and a thorough drying and scrubbing results. The acid drops eventually strike the walls of the tank, and tend to form a sheet of acid on the walls. The acid runs down the walls into the conical tank bottom 2. The outer end of the barrier wall is provided with supporting means having a plurality of the openings 22. The spent acid collects at 3 and runs out through ports 22 into discharge line 23. As can be seen, a baffle or barrier wall of an inverted frusto-conical shape is provided which defines separate inner and outer areas. The perforated support, the barrier wall, and the tank bottom define a chamber in a part of the outer area, for the collection and removal of liquid.

Although only one tank drier is shown in the drawings and described in detail, it will be readily understood that it is commonly desirable in large commercial installations to operate a plurality of driers in series. Thus, it would be desirable in a large drying operation to operate two or more individual units in countercurrent series flow. In this operation, the strong acid would be in contact with the driest gas, with the progressively weaker acid flowing toward the wet gas inlet. In order to minimize pumping in this type of installation, several units may be placed one above the other, so that the acid may flow from one to the other by gravity.

To clarify the invention still further, an actual installation will be described. The tank is a conventional 5 foot by 5 foot cylindrical, conical bottom tank. About ten gallons of concentrated sulfuric acid are run in initially to form the pool which just covers the impeller bottom. The impeller is rotated at between 1800 and 2100 revolutions per minute and concentrated sulfuric acid is then run in continuously. Wet gaseous chloride is passed through the tank at a rate of about 65 tons per day. The sheets of spray in the tank and the films of acid on the walls give an intimate contact with the chlorine and effect complete drying and scrubbing in a single pass. The installation is much less expensive initially and in upkeep than conventional packed tower equipment. The unit is very flexible and can handle 200 tons or more of wet chlorine per day with relative ease. The rate of drying is dependent, to a considerable extent, on the pressure drop which can be tolerated in the gas handling system, rather than on the actual drying capacity of the unit.

It will be obvious that suitable materials of construction must be used to handle the corrosive substances described. Where the chlorine is dry or nearly dry, plain steel can be used. However, resistant materials must be used to handle the sulfuric acid and wet chlorine.

It will readily occur to one skilled in the art that my improved apparatus and method may be used for gas cleaning and humidifying, as well as for the simple drying operation described.

I claim:

1. A dehydrating apparatus for wet gas comprising an enclosed cylindrical tank defining a dehydrating zone and having confining vertically disposed sidewalls, a top, and a downwardly sloping bottom; a barrier wall projecting upwardly from said bottom establishing an inner area for the retention of dehydrating liquid and an outer area for the collection of dehydrating liquid, said areas being respectively concentrically disposed; said barrier wall providing means for establishing pools of liquid in said areas wherein dispersed dehydrating liquid may be collected in said outer area and dehydrating liquid may be dispersed from said inner area; a supporting means attached to said barrier wall in the outer area, said supporting means having a plurality of openings therein for removal of spent liquid from the tank; means for supplying fresh dehydrating liquid to said inner area; conduit means for removing spent dehydrating liquid from the outer area and from said tank; liquid impelling means for upwardly and outwardly freely dispersing dehydrating liquid from the inner area throughout the dehydrating zone for collection as a downwardly flowing film on said vertically disposed sidewall; said downwardly sloping bottom providing means for directing freely dispersed liquid into the outer area; a gas inlet tangentially disposed with respect to said dehydrating zone above said liquid-containing areas; a gas outlet disposed along the axis of said cylindrical dehydrating zone in the upper region of said zone; and means for passing said wet gas upwardly and inwardly with a swirling movement into contact with the downwardly flowing film of dehydrating liquid and with the finely dispersed dehydrating liquid through the dehydrating zone.

2. The apparatus of claim 1 in which the barrier wall is of an inverted frusto-conical shape and extends above and generally parallel to the sloping tank bottom.

3. The apparatus of claim 1 in which the tank bottom, supporting means, and barrier wall provide a chamber for the collection of spent dehydrating liquid.

4. A gas and liquid contacting apparatus comprising a tank defining a contact zone and having upwardly directed sidewalls and a downwardly sloping bottom; gas inlet and outlet means; an inverted frusto-conical barrier wall spaced at its upper edge from said bottom and extending upwardly from the lowermost point of said bottom to define an inner area for the retention of liquid to be dispersed; said barrier wall and said bottom cooperating to define an outer area, concentric to said inner area, for the collection of dispersed liquid; said barrier wall providing means for establishing pools of liquid in said areas; support means extending from the lower side of the barrier wall to the tank bottom to define a chamber in said outer area for the withdrawal of spent liquid; said support means having a plurality of openings therein for the passage of spent liquid therethrough to said chamber; inlet and outlet conduits directly communicating with said inner area and said chamber, respectively; and means extending into said inner area for elevating and freely upwardly and outwardly dispersing liquid throughout the contact zone.

References Cited in the file of this patent

UNITED STATES PATENTS

| 985,963 | Zellweger | Mar. 7, 1911 |
| 1,083,057 | Clawson | Dec. 30, 1913 |
| 1,110,914 | Feld | Sept. 15, 1914 |
| 1,431,981 | Richter | Oct. 17, 1922 |
| 1,626,667 | Cramer et al. | May 3, 1927 |
| 1,669,638 | Wagner | May 15, 1928 |
| 1,905,068 | Sperr | Apr. 25, 1933 |
| 1,955,518 | Sherwood | Apr. 17, 1934 |
| 2,122,334 | Asbury | June 28, 1938 |
| 2,178,883 | Siedle | Nov. 7, 1939 |
| 2,527,015 | Lhota | Oct. 24, 1950 |
| 2,688,806 | Long | Sept. 14, 1954 |

FOREIGN PATENTS

| 331,219 | Great Britain | June 25, 1930 |